United States Patent [19]
Barry

[11] 3,820,579
[45] June 28, 1974

[54] BLIND STUD FASTENER
[75] Inventor: John K. Barry, Springfield, Pa.
[73] Assignee: Southco, Inc., Lester, Pa.
[22] Filed: July 13, 1972
[21] Appl. No.: 271,385

Related U.S. Application Data
[63] Continuation of Ser. No. 128,695, March 29, 1971, abandoned.

[52] U.S. Cl................. 151/41.73, 29/432, 29/509, 403/242, 403/282
[51] Int. Cl..... B23p 11/00, F16b 9/00, F16b 39/00
[58] Field of Search .......... 151/41.73; 29/432, 509, 29/521, 275; 287/20.3, 20 R; 52/707; 85/9 R; 403/242, 282

[56] References Cited
UNITED STATES PATENTS

| | | | |
|---|---|---|---|
| 2,486,769 | 11/1949 | Watson | 151/41.73 |
| 2,906,005 | 9/1959 | Harris | 29/509 UX |
| 2,949,142 | 8/1960 | Sumerak | 151/41.73 |
| 3,002,414 | 10/1961 | Nelson | 85/9 R |
| 3,556,189 | 1/1971 | Ernest | 151/41.73 |
| 3,699,637 | 10/1972 | Rosiek | 151/41.73 X |

FOREIGN PATENTS OR APPLICATIONS
693,317  6/1953  Great Britain .................. 151/41.73

Primary Examiner—Ramon S. Britts
Attorney, Agent, or Firm—Paul & Paul

[57] ABSTRACT

A blind stud fastener has an enlarged head and a shank which is usually threaded. The enlarged head has a knurled perimeter or other configuration designed to prevent rotary motion of the stud in the panel. The stud is installed in a sheet metal panel, or panel of plastic or other material, without passing through the panel, by means of a special punch the face of which is designed to first push and embed the head of the stud to a proper depth in a counterbored hole in the panel and thereafter by means of a forwardly-projecting peaked annulus or other closed configuration to cause material of the panel to flow across the edge and over the surface of the head which is nearer to the shank.

1 Claim, 12 Drawing Figures

PATENTED JUN 28 1974
3,820,579
SHEET 1 OF 2
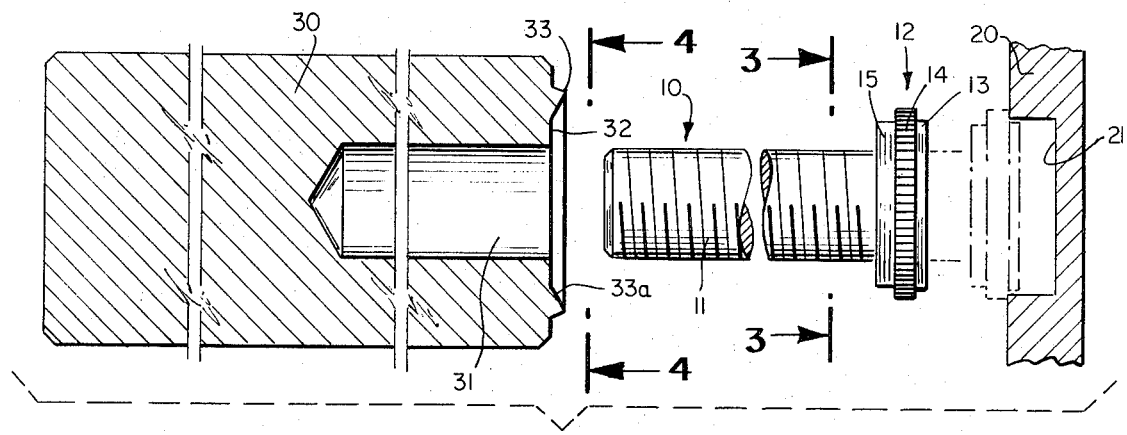
Fig. 1
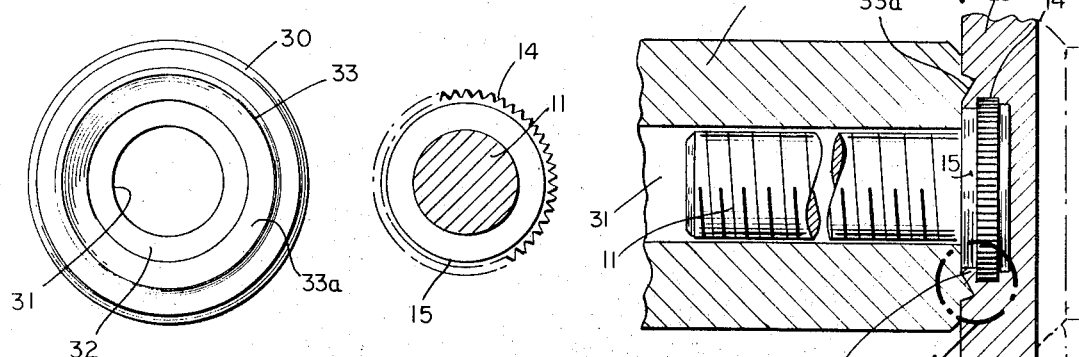
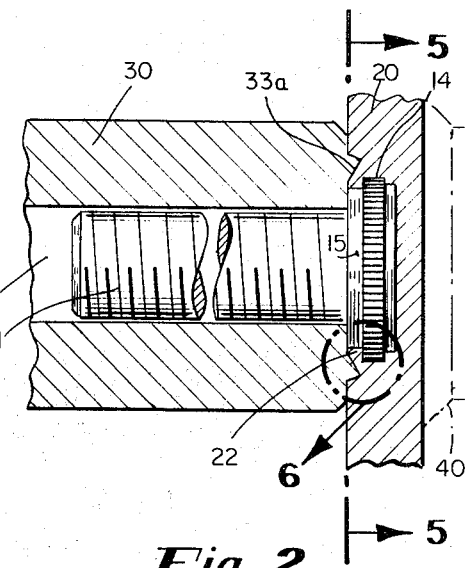
Fig. 4  Fig. 3  Fig. 2
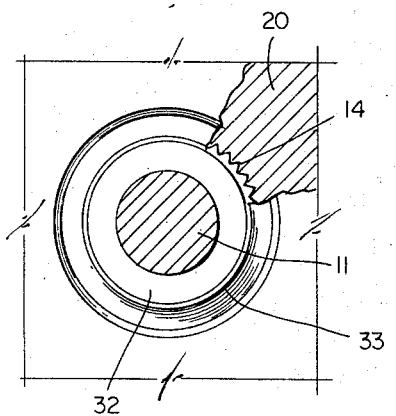
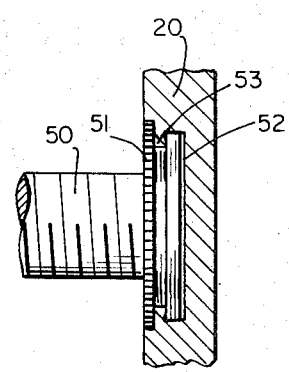
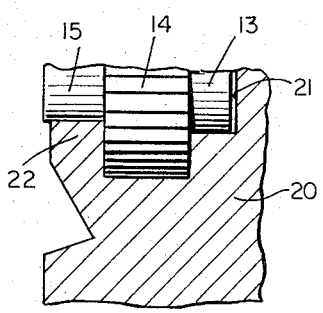
Fig. 5  PRIOR ART  Fig. 6
Fig. 7
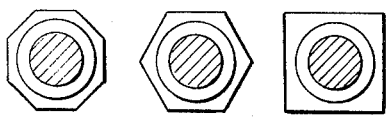
Fig. 8
INVENTOR.
John K. Barry
BY
Paul & Paul
ATTORNEYS.

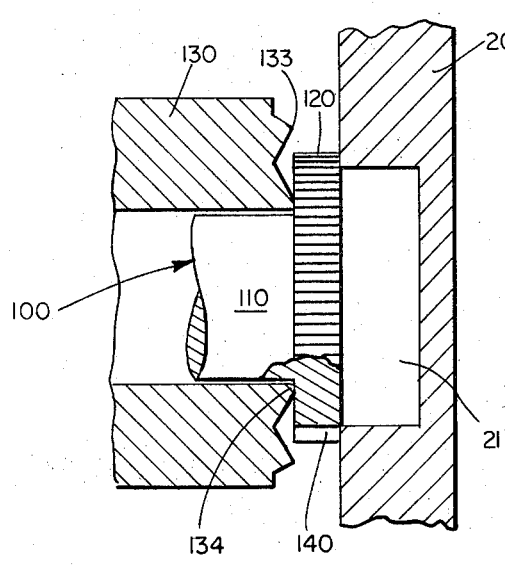
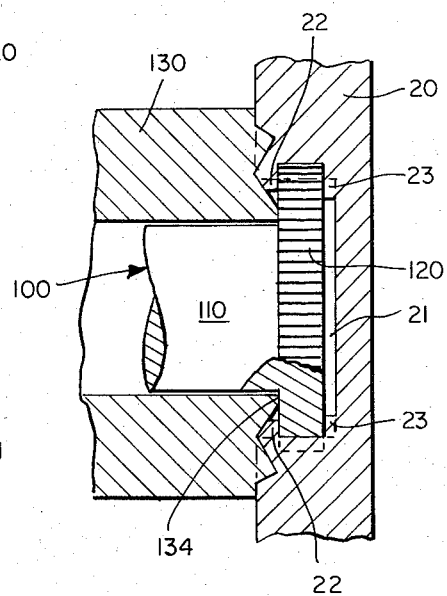
_Fig. 9a_  _Fig. 9b_
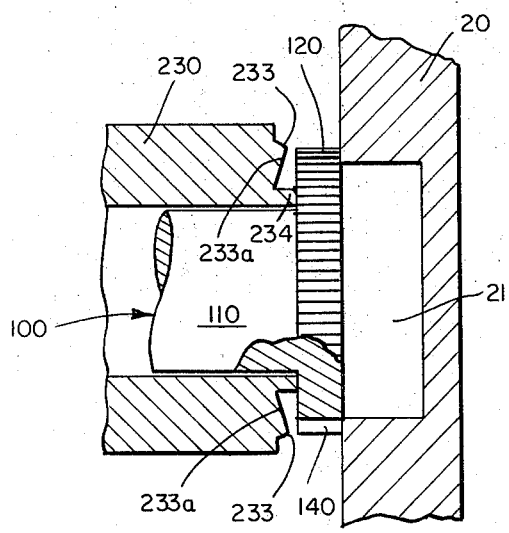
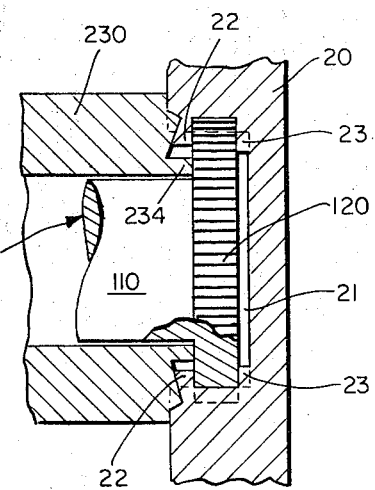
_Fig. 10a_  _Fig. 10b_

BLIND STUD FASTENER

This is a continuation of application Ser. No. 128,695, filed Mar. 29, 1971, now abandoned.

BACKGROUND OF THE INVENTION

The present invention relates to fasteners, particularly sheet metal fasteners, and particularly to blind studs or standoffs. The fasteners may, however, also be used in plastic or other material provided the material is ductile rather than brittle.

The prior art includes studs or standoff fasteners of the type which may be installed in a counterbored hole in a sheet metal panel without passing completely through the panel. Such type of prior art fastener is illustrated in FIG. 7.

Referring now to FIG. 7, such prior art studs or fasteners are based on a functional principle which may be summarized as follows: A threaded stem or column 50 has a first enlarged head-like flange 51 at one end thereof. This first head-like flange 51 is larger in diameter than a second flange portion 52 which lies on the far side of the first flange 51. The second flange portion 52 contains an undercut or groove 53 in its flank, the groove being immediately adjacent the first larger head-like flange 51. The hole which is counterbored in the panel 20 has a diameter corresponding to that of the smaller diameter second flange 52. When the head end of the fastener is inserted into the counterbored hole, the first or nearer flange 51, being larger, rests against the panel 20 and overlaps the edge of the counterbored hole, as for example, by one sixty-fourth to one thirty-second inch.

When the prior art fastener of FIG. 7 is installed into the panel by an installation punch or tool, the larger flange 51 of the head is pressed down into the metal of the panel until the said flange 51 is flush with the panel surface. In so doing, the said first flange 51 displaces a small amount of material and causes it to flow into the undercut or groove 53 which is just beyond or behind the said first flange 51, thereby keying the fastener into the panel and providing some resistance to axial pull-out. The prior art fastener just described also has some resistance to side moment on the shank which would rock the fastener out of the panel.

It will be seen from the above description of the blind sheet metal fasteners of the prior art that these fasteners have three structural features which develop their holding power, namely, a first nearer larger flange, a second more remote flange, and an undercut between the first and second flanges. Since these three structural features lie along the axial length of the fastener, it will be seen that if such fasteners are used in sheet metal panels which are relatively thin (the minimum being three thirty-seconds inch), the dimensions of the three structural features must of necessity be very closely restricted, and none is really large enough to allow the installed fastener to attain a strong hold in the panel. As a result, these prior art fasteners may prematurely and undesirably come out of the panel when subjected to axial pull-out, or to rocking moment, or to a twisting moment, at relatively low load conditions.

SUMMARY OF THE INVENTION

A principal object of the present invention is to provide a blind stud sheet metal fastener which has considerably increased resistance to axial pull-out and rocking moment as well as improved resistance to twisting moment.

The foregoing objective is achieved by providing a stud fastener which requires only a head of larger diameter than the shank portion with the head having a knurled perimeter or configuration which will resist a turning moment. Since the head end of the new fastener requires but a single feature, in contrast to the three head features discussed hereinbefore with respect to the prior art fasteners, the single-feature head can be made thick enough to resist tensile failure and to provide adequate edge thickness so that a peripheral irregularity, such as a knurl or flattened portion or portions, will develop the full torque strength of the fastener.

While the only requirement of the new blind stud fastener is that described immediately above, the new stud may desirably have additional features, such as a pilot portion behind the head (or farther from the shank end) and a shoulder portion between the head and the threaded shank. These features may be added, if desired, provided panel thickness permits, but they are not essential to the improved basic functional strength of the new design.

BRIEF DESCRIPTION OF THE DRAWINGS

FIG. 1 is an illustration showing a presently preferred form of new blind stud with shank broken, and also showing in section and broken the new form of installation punch, and also showing in section a fragment of a sheet metal panel;

FIG. 2 is a view, partly in section, showing the blind stud of FIG. 1 inserted into the panel, using the installation punch of FIG. 1;

FIG. 3 is a view, in cross section, looking along the line 3—3 of FIG. 1;

FIG. 4 is a view of the forward end of the punch looking along the line 4—4 of FIG. 1;

FIG. 5 is a view, partly broken away, of the new stud being installed in the panel by the new punch, as seen looking along the line 5—5 of FIG. 2;

FIG. 6 is an enlarged view of the encircled area identified by the numeral 6 in FIG. 2;

FIG. 7 is a fragmentary view, in section, of a prior art blind stud fastener;

FIG. 8 is a diagrammatic representation of some of the different head configurations which may be used to prevent rotary motion of the head in the hole;

FIGS. 9a and 9b are sequential illustrations, partly in section, showing a basic form of blind stud fastener being installed in a panel by a cooperating punch. The forms of stud and punch shown embody the basic concept of the present invention but are not the preferred forms;

FIGS. 10a and 10b are sequential illustrations, partly in section. The stud fastener is identical but the punch is different from that shown in FIGS. 9a and 9b. In FIGS. 10a and 10b the peaked annulus has a diameter equal to (not larger than) the diameter of the knurled head of the stud fastener.

DESCRIPTION OF THE PREFERRED EMBODIMENTS

While the fastener of the present invention may also be used in a plastic panel or panel of other material which is ductile and not brittle, the fastener will be largely used in metal panels of steel or aluminum.

Referring now to FIG. 1, there is shown a presently preferred form of new blind stud 10 having a threaded shank 11 and an enlarged head 12. In the form shown in FIG. 1, the enlarged head 12 comprises a pilot portion 13, an enlarged knurled portion 14, and a shoulder portion 15. However, as indicated previously, in accordance with the basic concept of the present invention, the head may be merely an enlarged single-feature head, i.e., a head of one diameter with knurled perimeter or other configuration. In other words, the pilot portion 13 and shoulder portion 15, while desirable, are not essential to the basic concept, as will be later discussed in connection with FIG. 7.

Returning now to the preferred embodiment shown in FIG. 1, the pilot portion 13 of the blind stud is shown in phantom entering the counterbored hole 21 in the sheet metal panel 20 into which the stud 10 is to be blindly installed. The diameter of the counterbored hole 21 is but very slightly larger than the diameter of the pilot portion 13 and is smaller than the diameter of the enlarged knurled portion 14. Thus, as seen in FIG. 2, when the stud 10 is pressed into the counterbored hole 21 by the installation punch 30, using an anvil 40 as a back-up, material of the metal panel 20 flows into the grooves of the parallel knurls of knurled portion 14, as best seen in FIG. 5.

In accordance with a preferred embodiment of the present invention the new stud fastener 10 is installed into the sheet metal panel 20 by means of a special installation punch 30. Punch 30 in its preferred form has a bore 31 which receives, with a sliding fit, the threaded shank portion 11 of the stud 10. The forward face of punch 30 has a peaked annulus or ring 33 which projects forwardly therefrom by a distance preferably slightly less than the thickness of the shoulder portion 15 of the stud fastener. The diameter of the peaked annulus 33 is preferably larger than the enlarged head of the stud fastener. The annular portion 32 of the face of punch 30 within the annulus 33 and immediately encircling the bore 31, is designed to abut against the face of the shoulder 15 of the stud 10, as seen in FIG. 2, and functions to press the head 12 into the counterbored hole 21. Before the face of pilot portion 13 of the stud 10 reaches the bottom of the counterbored hole 21, the peak of the forwardly projecting annulus 33 meets the face of the panel 20, and as forward motion of the punch 30 and stud 10 continues, backed up by the back-up anvil 40, the peaked annulus 33 causes metal of the panel 20 to flow radially inwardly toward the knurled portion 14 and over the edge thereof into the annular notch formed by the shoulder portion 15 of the head 12, forming at the shoulder 15 an annular locking portion 22, which is best seen enlarged in FIG. 6.

To summarize, the installation tool or punch 30 in its preferred form is so designed that it will first embed the knurled head 12 of the stud 10 to a proper depth in the counterbored hole 21 in the panel 20, and, thereafter, as the forward motion of the punch 30 toward the panel 20 continues, the peaked annular portion 33 will gather metal material from the panel area adjacent the hole 21 and outside the knurled portion 14 and form this material tightly around the knurl 14 or other peripheral irregularity of the head 12 and will also flow material across the edge of the knurled portion 14 and into the annular notch surrounding the shoulder portion 15. To perform this work, the inner inclined surface 33a of the peaked ring 33 may be inclined at an angle of the order of 30° relative to the face of the punch. The height of the ring 33 may be of the order of 0.026 inch. The material which is thus caused to flow is of sufficient thickness and of such increased density, due to the working and compacting of the material by the punch, that the stud fastener 10 is retained in the panel 20 with greatly improved strength, as compared with prior art fasteners.

In testing stainless steel specimens of the type of stud illustrated in FIG. 1, installed in steel panels, and in aluminum panels, the threaded male stud broke off, whether in tension, or in side bending, or in torque, leaving the head portion 12 still embedded in the panel 20.

It will be understood that the configuration of the head end of the punch will be varied to accommodate various shapes of fastener head. Also, the forward end of the punch may be varied to utilize either more or less installation force in moving the metal material of the panel around and over the head of the stud, thereby to either increase or decrease the amount of work hardening and the compression of the material which is caused to flow. Or, the configuration of the end of the punch may be varied to cause more or less material to flow over the edge of, and to build up against, the face of the stud head nearer to the threaded shank.

The particular form of fastener head, and the particular form of punch end, shown in FIGS. 1–6 of the drawings of the present application are presently preferred as providing the amount of work hardening and the amount of material flow desired, as compared with the amount of installation force which is required to be used to install the male threaded studs into soft cold-rolled steel of hardness less than RB 75, or into wrought aluminum panels, such as 5052-H 34.

As indicated previously hereinbefore, while the provision of a head 12 having a pilot portion 13 and a shoulder portion 15 is desirable, it is not essential to the basic form of improved stud fastener. The basic form of stud fastener is shown in FIGS. 9a, 9b, 10a and 10b. As thereshown, the stud fastener 100 has a threaded shank 110 and an enlarged head 120 having a single feature, rather than three features. Head 120 has a configuration to resist turning. While it may have any of the configurations illustrated diagrammatically in FIG. 8, as well as others, the head 120 in FIGS. 9a, 9b, 10a and 10b is shown as having a circular perimeter which is fully knurled with parallel knurls. Punch 130, in FIGS. 9a and 9b, is modified, as compared with punch 30 of FIGS. 1–6, and has an annular push portion 134 which projects forwardly from the face of the punch 130 slightly beyond the peaks of the peaked annulus 133. Push portion 134 engages the circular surface of the head 120 of the stud 110 and pushes the head into the counterbored hole 21 of the panel 20. The hole 21 has a depth greater than the thickness of head 120, and a diameter equal to that of head 120 within the knurls 140 (i.e. not including the knurled portion 140), as is seen broken away in FIG. 9a where a tooth of the knurled portion 140 is clearly visible. Thus, when the head 120 is pushed by push portion 134 of the punch 130 into the hole 21, the knurls 140 cause metal material of panel 20 to flow down the side walls of hole 21 and into the bottom, as indicated in FIG. 9b by the material 23.

It will be seen in FIGS. 9a and 9b that as the head 120 is pushed into hole 21, before the end face of head 120 reaches the bottom of the hole, the peak of the peaked annulus 133 reaches the surface of the panel 20, and as the forward movement of punch 130 and head 120 continue, material of the panel 20 outside of the knurled diameter of head 120 is caused by the inner inclined surface of peaked annulus 133 to flow over the edge of the knurls 140 and into the region 22, thereby forming an annular lock ring which holds the stud 100 securely in the panel 20. As indicated previously, the stud 100 and its cooperating punch 130 depict the basic concept of the present invention, but the preferred form has a pilot portion 13 and a shoulder portion 15, as is illustrated in FIGS. 1–6.

In FIGS. 10a and 10b the stud fastener 100 is identical to that illustrated in FIGS. 9a and 9b but the punch 230 is different. Punch 230 has a peaked annulus 233 which has a diameter equal, or substantially equal, to that of the head 120 including the knurls 140, whereas punch 130 of FIGS. 9a and 9b has a peaked annulus 133 which has a diameter considerably larger than the knurled diameter of head 120. In the form illustrated in FIGS. 10a and 10b, when the peaked annulus 233 reaches the surface of panel 20, the inner inclined surface 233a pushes against the metal material at the serrated edge of the hole 21 which remained after the knurls 140 had been pushed therethrough, and this edge material is pushed forwardly by the inclined surface 233a forming the annular lock ring 22.

In the foregoing descriptions of FIGS. 1–6, 9a, 9b, 10a and 10b, the head of the stud fastener is generally circular and accordingly the peaked projections 33, 133 and 233 are circular or ring-like and each has been referred to as a peaked annulus. It is to be understood that if the head of the stud is other than circular, as for example, is any of the shapes shown in FIG. 8, that the peaked projection will have a perimeter of corresponding configuration.

When the stud fastener of the present invention is compared with the prior art fastening studs, it has been found that the head of the fastener device of the present invention will provide more retention in the panel against side moment or tensile pull-out because the panel material is caused to flow around the diameter of the head and over its outer edge, rather than to flow downward and into a radially smaller groove below the head, as is presently done on the prior art fasteners of the type illustrated in FIG. 7. Thus, the retention of the new stud is higher because the gripping or holding material is located further from the center line of the fastener, creating a greater holding moment against rock-out. It will be observed that the gripping or holding material surrounds and overlaps a larger diameter flange (ie, the head) than when it enters the groove under the head, such as groove 53 in FIG. 7. This provides perimetrically more material to hold the fastener head in the hole against tensile pull-out. This feature is in addition to the greater thickness of gripping or holding material obtained with the new fastener, and the higher strength of the holding material due to the increased compacting and work hardening of the material created by the new punch design.

A further advantage of this invention is that visual inspection of the installed fastener can be made to determine that proper material flow has taken place and that the fastener is properly retained. Since the material moved by the punch flows over the near side of the fastener head it is visible at all times and future condition of the installation as well as immediate quality of the installation can be determined by quick visual inspection.

Another advantage is that the dimensions of the simplified head do not require close tolerances to obtain a good installation as was necessary with prior art fasteners of the type shown in FIG. 7. Thus, the new fastener is easier and less costly to manufacture.

It will be understood that in lieu of the fastener having an externally threaded stud or shank, it may have a solid locating pin, or an internally threaded cylinder.

It will also be understood that other punch forms may be used depending upon the configuration of the head of the fastener and the degree of work hardening desired for the material to be moved.

In the foregoing description, the panel 20 into which the blind stud fastener is installed has frequently been referred to as a metal panel, and in most instances the panel will in fact be of metal. However, it is to be understood that the panel may be of plastic or other material provided it is ductile rather than brittle and will flow to form the locking ring 22.

What is claimed is:

1. In combination:
   a. a thin panel of sheet metal or other ductile material having in the face thereof at least one blind hole of circular cross-section having a depth less than the thickness of the panel;
   b. a one-piece stud fastener thrust pressed by an installation and panel-material upset punch into said hole, said stud fastener including:
      b–1. a shank portion outside said hole at right angles to said panel face;
      b–2. an enlarged head portion pressed within said hole having an irregular peripheral surface for resisting torsional forces, the major diameter of said head portion being larger than that of said hole, with said irregular peripheral surface embedded in the material of said panel, the axial thickness of said head portion being less than the depth of said hole;
      b–3. a pilot portion within said hole on the opposite side of said head portion from said shank portion, said pilot portion being of a diameter substantially equal to that of said hole;
      b–4. a thrust-receiving shoulder portion between said shank portion and said head portion, and being contiguous with said shank and head portions, said shoulder portion having a constant diameter larger than said shank portion and smaller than said head portion, such shoulder portion being defined by a planar surface substantially coplanar with said panel face and being adjacent to and at right angles with said shank, and a cylindrical peripheral surface extending from said planar surface to said head portion, the surface of said head portion adjacent said cylinder surface extending at right angles thereto, and a circumferentially continuous locking ring of upset panel material in engagement with said surface of said head portion and having a thickness corresponding to the thickness of said shoulder, said upset panel material overlying said head portion and forming said continuous locking ring of panel material which provides resistance against pull-out and rock-out forces, said locking ring comprising panel material upset from the face of said panel outside and radially beyond the major diameter of said head portion.

* * * * *